United States Patent
Brake et al.

(10) Patent No.: US 11,163,962 B2
(45) Date of Patent: Nov. 2, 2021

(54) AUTOMATICALLY IDENTIFYING AND MINIMIZING POTENTIALLY INDIRECT MEANINGS IN ELECTRONIC COMMUNICATIONS

(71) Applicant: INTERNATIONAL BUSINESS MACHINES CORPORATION, Armonk, NY (US)

(72) Inventors: Kyle M. Brake, Dublin, OH (US); Stephen A. Boxwell, Franklin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 16/510,860

(22) Filed: Jul. 12, 2019

(65) Prior Publication Data
US 2021/0011976 A1  Jan. 14, 2021

(51) Int. Cl.
*G06F 40/30* (2020.01)
*G06K 9/62* (2006.01)
*G06F 40/242* (2020.01)

(52) U.S. Cl.
CPC ............ *G06F 40/30* (2020.01); *G06F 40/242* (2020.01); *G06K 9/627* (2013.01); *G06K 9/6256* (2013.01)

(58) Field of Classification Search
CPC . G06F 17/2785; G06F 17/2735; G06K 9/627; G06K 9/6256
See application file for complete search history.

(56) References Cited

U.S. PATENT DOCUMENTS

| | | | |
|---|---|---|---|
| 7,139,031 B1 | 11/2006 | Bray et al. | |
| 10,069,775 B2 | 9/2018 | Guna et al. | |
| 2008/0168095 A1 | 7/2008 | Larcombe et al. | |
| 2009/0282019 A1* | 11/2009 | Galitsky | G06F 40/279 |
| 2010/0205123 A1 | 8/2010 | Sculley et al. | |

(Continued)

OTHER PUBLICATIONS

Stubbs et al, "Natural Language Annotation for Machine Learning", O'Reilly, 2013, accessed online at <https://doc.lagout.org/science/Artificial%20Intelligence/Machine%20learning/Natural%20Language%20Annotation%20for%20Machine%20Learning_%20A%20Guide%20to%20Corpus-...%20%5BPustejovsky%20%26%20Stubbs%202012-11-04%5D.pdf>, 343 pages.

(Continued)

*Primary Examiner* — Kevin Ky
(74) *Attorney, Agent, or Firm* — Aaron N. Pontikos; William H. Hartwell

(57) ABSTRACT

A computer system evaluating an input segment of a communication, in parallel, by a baseline classification model trained with baseline passages indicating dictionary meaning and multiple generative sequence models each trained to classify a particular passage from among multiple indirect passages indicating usage with an indirect meaning, to receive a separate score from the baseline classification model and each of the generative sequence models, each separate score indicating a classification probability for the input segment. The computer system, responsive to one or more particular scores generated by one or more of the generative sequence models exceeding a baseline score generated by the baseline classification model summed with a tuning factor, flagging the input segment as having a potentially indirect meaning.

20 Claims, 7 Drawing Sheets

(56) References Cited

U.S. PATENT DOCUMENTS

| | | |
|---|---|---|
| 2010/0280828 A1 | 11/2010 | Fein et al. |
| 2013/0090917 A1 | 4/2013 | Chalmers et al. |
| 2014/0149399 A1* | 5/2014 | Kurzion .............. G06F 16/9535 707/723 |
| 2014/0200893 A1 | 9/2014 | Vanjani et al. |
| 2015/0309987 A1* | 10/2015 | Epstein ................ G06F 40/279 704/9 |
| 2017/0024461 A1* | 1/2017 | Mac an tSaoir ...... G06F 16/334 |
| 2017/0061248 A1 | 3/2017 | Ryan, Jr. et al. |
| 2017/0222960 A1 | 8/2017 | Agarwal et al. |
| 2017/0351961 A1 | 12/2017 | Kochura et al. |
| 2018/0219820 A1 | 8/2018 | Kramer et al. |
| 2019/0311268 A1* | 10/2019 | Tilton .................... G06F 40/30 |
| 2020/0365148 A1* | 11/2020 | Ji ............................ G10L 15/30 |

OTHER PUBLICATIONS

"Method and System for Alerting a User about Aggressive Language within Electronic Communication", IPCOM000217973D, ip.com, May 14, 2012.

* cited by examiner

AUTOMATICALLY IDENTIFYING AND MINIMIZING POTENTIALLY INDIRECT MEANINGS IN ELECTRONIC COMMUNICATIONS

BACKGROUND

1. Technical Field

One or more embodiments of the invention relate generally to data processing and particularly to automatically identifying and minimizing potentially indirect meanings in electronic communications.

2. Description of the Related Art

In natural language communications, some words or phrases with common meanings also take on indirect meanings depending on the context of use of the word or phases.

BRIEF SUMMARY

In one embodiment, a method is directed to evaluating, by a computing device, an input segment of a communication, in parallel, by a baseline classification model trained with a plurality of baseline passages indicating dictionary meaning and a plurality of generative sequence models each trained to classify a particular passage from among a plurality of indirect passages indicating usage with an indirect meaning, to receive a separate score from the baseline classification model and each of the plurality of generative sequence models, each separate score indicating a classification probability for the input segment. The method is directed to, responsive to one or more particular scores generated by one or more of the plurality of generative sequence models exceeding a baseline score generated by the baseline classification model summed with a tuning factor, flagging, by the computing device, the input segment as having a potentially indirect meaning.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to evaluate an input segment of a communication, in parallel, by a baseline classification model trained with a plurality of baseline passages indicating dictionary meaning and a plurality of generative sequence models each trained to classify a particular passage from among a plurality of indirect passages indicating usage with an indirect meaning, to receive a separate score from the baseline classification model and each of the plurality of generative sequence models, each separate score indicating a classification probability for the input segment. The stored program instructions comprise program instructions to, responsive to one or more particular scores generated by one or more of the plurality of generative sequence models exceeding a baseline score generated by the baseline classification model summed with a tuning factor, flag the input segment as having a potentially indirect meaning.

In another embodiment, a computer program product comprises a computer readable storage medium having program instructions embodied therewith, wherein the computer readable storage medium is not a transitory signal per se. The program instructions are executable by a computer to cause the computer to evaluate, by a computer, an input segment of a communication, in parallel, by a baseline classification model trained with a plurality of baseline passages indicating dictionary meaning and a plurality of generative sequence models each trained to classify a particular passage from among a plurality of indirect passages indicating usage with an indirect meaning, to receive a separate score from the baseline classification model and each of the plurality of generative sequence models, each separate score indicating a classification probability for the input segment. The program instructions are executable by a computer to cause the computer to, responsive to one or more particular scores generated by one or more of the plurality of generative sequence models exceeding a baseline score generated by the baseline classification model summed with a tuning factor, flag, by the computer, the input segment as having a potentially indirect meaning.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
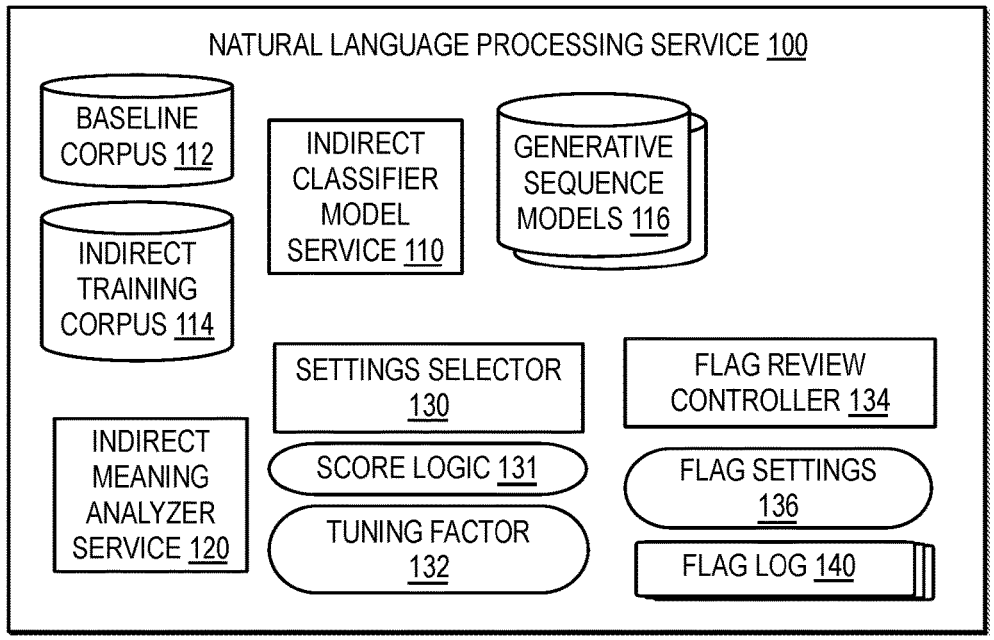
FIG. 1 illustrates a block diagram of one example of a natural language processing (NLP) service for automatically identifying and minimizing indirect meanings in electronic communications.

FIG. 1 illustrates a block diagram of one example of a natural language processing (NLP) service for automatically identifying and minimizing indirect meanings in electronic communications.

In one example, an NLP service 100 provides a service for identifying and minimizing potentially indirect meanings in electronic communications. For example, in an electronic communication, such as an email, a user may input a word or phrase, intending for the word or phrase to be understood based on a common, direct dictionary meaning in a particular language, however, the word or phrase has an indirect meaning that could be implied and understood by the reader, based on the reader having an understanding of the word or phrase based on a dialect meaning, sub-dialect meaning, or slang dictionary meaning of the word by itself, the word in a particular combination or sequence, or the word or phrase as translated into another language. In one example, the vernacular spoken by a group or within a region may include idioms that acquire a unique meaning to the group or within the region, but when incorporated into an electronic communication the unique meaning is considered an indirect meaning in a communication for an audience outside the group or region. In addition, non-native speakers of a language may initially learn the common dictionary meaning of words and not recognize words and phrases used in idioms that have an indirect meaning, potentially including an unintended inuendo. In another example, a word or phrase may include an abbreviation, where an abbreviation may have a common, dictionary meaning in a particular language, however, the abbreviation may take on alternative meanings, considered indirect meanings, based on the reader's understanding of the abbreviation based on dialect meaning, sub-dialect meaning, or slang dictionary meaning.

In one example, communications with words or phrases that have an indirect meaning increase the probability that a recipient may understand the communication based on the indirect meaning, which may negatively impact the drafter's communication goals for the communication. For example, a phrase's that is directed to a plural term may have a common dictionary meaning may refer to equipment, but a slight variation of the phrase directed to a singular term may have an indirect meaning of a beverage, such that the indirect meaning of the plural term may be understood as a beverage, which may negatively impact a communication by the recipient understanding the phrase as referring to a beverage when the drafter intended to refer to equipment.

In the example, NLP service 100 includes an indirect classifier model service 110. Indirect classifier model service 110 trains multiple generative sequence models 116 for automatic classification of common, direct meanings and potentially indirect meanings in electronic communications. In one example, machine learning plays a central role in artificial intelligence-based applications that interact with one or more NLP systems, such as NLP service 100. For example, AI based applications may include, but are not limited to, speech recognition, natural language processing, audio recognition, visual scene analysis, email filtering, social network filtering, machine translation, data breaches, optical character recognition, learning to rank, and bioinformatics. In one example, a selection of AI based applications may refer to computer systems, which may operate in one or more types of computing environments, carrying out tasks that require one or more types of text classification analysis. In one example, machine learning may represent one or more types of AI that are based on training a machine with data and algorithms that learn from and make predictions on data. One of the primary outcomes of the process of creating and training a machine learning environment is a data object, referred to as a model, built from sample inputs. In one example, the one or more models in generative sequence models 116 each represent a data object of a machine learning environment. According to an advantage of the invention, a data object in a machine learning manages automated text classification analysis of volumes of text that are so large, such as millions of words and phrases, that a person attempting to analyze the same volumes of text would require years of work to reach a same conclusion that machine learning based data objects are capable of performing in increments of a seconds or less, and likely with a greater accuracy than could be performed by a person having to process the same volume of information.

In one example, indirect classifier model service 110 trains a first model within generative sequence models 116 based on a baseline corpus 112, which includes multiple passages indicating common, dictionary meanings of words and phrases. In addition, indirect classifier model service 110 trains multiple additional models within generative sequence models 116 based on indirect training corpus 114, which includes multiple passages indicating potentially negative indirect meanings of words and phrases. In one example, indirect classifier model service 110 trains a separate model within generative sequence model 116 for each instance of indirect usage of a word or phrase within indirect training corpus 114, such as for each instance of a combination or sequence of words including a particular word or particular phrase. According to an advantage of the present invention, by training separate models for each indirect meaning of words and phrases identified in indirect training corpus 114, indirect classifier model service 110 generates classifier models that efficiently evaluate, in parallel, words and phrases that by themselves are used according to a common meaning, but in certain combinations or sequences, have a potentially negative indirect meaning. In addition, according to an advantage of the present invention, by training separate models for each indirect meaning of words and phrases identified in indirect training corpus 114, NLP service 100 is quickly adaptable to changing norms in indirect meanings of words and phrases because indirect classifier model service 110 can quickly train additional models or remove outdated models to reflect changing norms and vernacular that may result in indirect meanings of words and phrases that potentially negatively impact the understood meaning of a communication.

In one example, NLP service 100 includes an indirect meaning analyzer service 120. Indirect meaning analyzer service 120 analyzes electronic communications received by NLP service 100 to automatically minimize indirect meanings in electronic communications by identifying and recommending replacement of potentially indirect meanings. In the example, indirect meaning analyzer service 120 analyzes an electronic communication across each of generative sequence models 116 and obtains a score from each model of generative sequence model 116 indicating the classification likelihood for the electronic communication by the model. In the example, indirect meaning analyzer service 120 applies one or more types of score logic 131 to compare the score of the baseline model trained by baseline corpus 112 with each of the scores of the series of models trained by indirect training corpus 114 in view of a tuning factor 132. In the example, based on the application of score logic 130 to compare the score of the baseline model trained by baseline corpus 112 with each of the scores of the series of models trained by indirect training corpus 114 in view of a tuning factor 132, indirect meaning analyzer service 120 determines whether to replace one or more words or phrases and whether to set one or more flags for the electronic communication based on flag settings 136. In the example, a flag review controller 134 determines how and where to direct any flags set, based on flag settings 136.

In one example, NLP service 100 includes a settings selector 130 for setting one or more of score logic 131, tuning factor 132, and flag settings 136. In one example, settings selector 130 provides an interface through which a client sets one or more specifications in one or more of score logic 131, tuning factor 132, and flag settings 136. In another example, settings selector 130 monitors flags set and responses to flag settings as logged in a flag log 140 and dynamically determines and adjusts one or more settings in one or more of score logic 131, tuning factor 132, and flag settings 136 to meet client performance specifications or increase accuracy. In another example, an evaluator, such as a human resources or public relations entity that oversees communications by a client, may periodically evaluate flag log 140 to determine and adjust one or more settings in one or more of score logic 131, tuning factor 132, and flag settings 136 based on the indicators in flag log 140 of words and phrases that result in flags being set.

In one example, by NLP service 100 automatically minimizing indirect meanings in electronic communications by identifying and recommending replacement of words and phrases with potentially indirect meanings, the probability that an electronic communication will be read by a recipient as having an unintended meaning, which may negatively impact how a the communication is understood, is reduced. In one example, a client, such as a business entity, selects to apply NLP service 100 to filter all electronic communications by multiple users through the client's electronic communication services, such as email and text communication services, to minimize accidental, unintentional, and intentional uses of words and phrases with potentially negative indirect meanings, to mitigate potential issues that may arise through the use of words and phrases with potentially negative indirect meanings.

In one example, indirect meanings of words and phrases in many languages have increasingly changing norms because of the proliferation of memes, online dictionaries with user-defined vernacular, and other forms of communication contributing to words and phrases taking on new meanings to groups of people with access to a specific communication platform through which the norm of a word or phrase is changed to have a different meaning. In one example, a meme may include a piece of text that is copied, and may include a slight modification of the text, to create a humorous indirect meaning, and then spread by users through social media services and electronic communication services. The increasing changes to language norms increases the potential for a user drafting an electronic communication to unintentionally and unknowingly use of a word or phrase that has recently taken on an indirect meaning. According to an advantage of the invention, indirect classifier model service 110 automatically performs frequent monitoring of changes to norms in the meaning of a word or phrase through monitoring online sources of dialect and subdialect meanings, such as monitoring for changes to a slang dictionary or monitoring memes in social media communications, updating indirect training corpus 114 with the changes in meaning, and training additional models in generative sequence models 116 to classify words and phrases that have changes to the indirect meaning that are potentially negative, to alert users of recent changes to the indirect meaning of words and phrases and automatically recommend replacement. According to an advantage of the invention, indirect classifier model service 110 efficiently manages the automated detection and elimination of unintended uses of words and phrases with indirect meanings that may negatively impact the goal of a communication, such as removing unintended innuendo, in an electronic communication environment where the rate at which norms of words and phrases are changing makes it virtually impossible for a single person or even team of people to monitor for and manage the reduction of words and phrases with potentially negative meanings.

Figure 2:
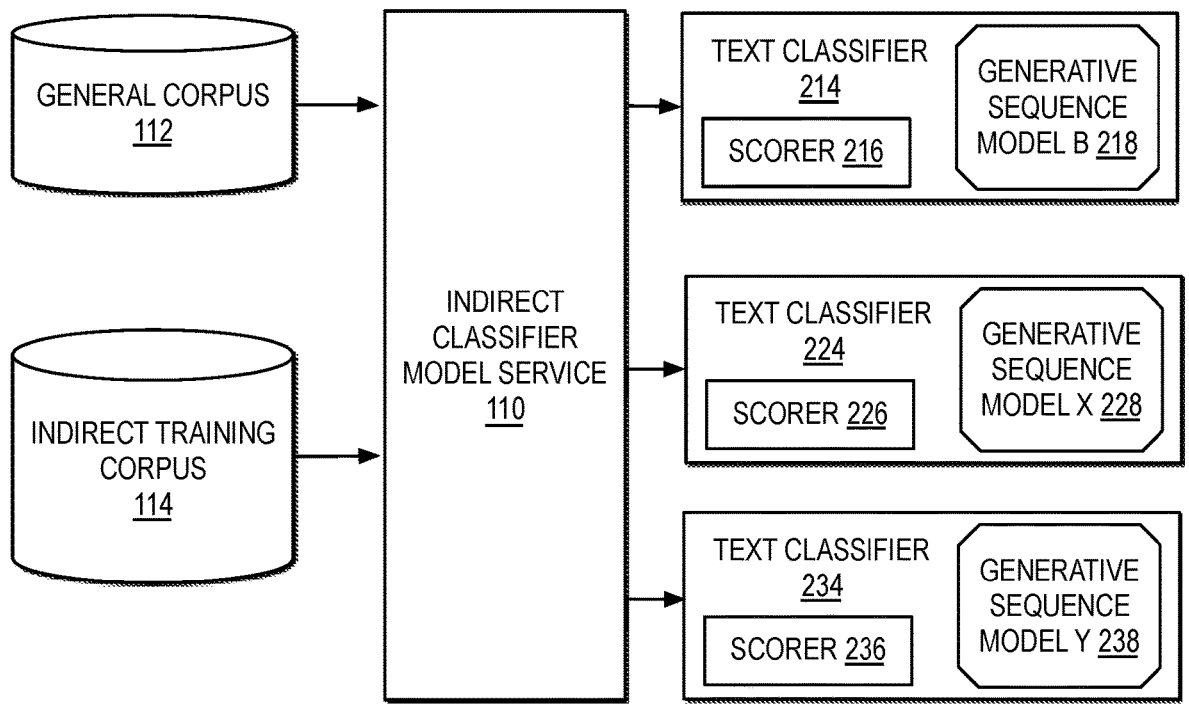
FIG. 2 illustrates a block diagram of one example of an indirect classifier model service for managing automatic classification of indirect meanings in electronic communications.

FIG. 2 illustrates a block diagram of one example of an indirect classifier model service for managing automatic classification of indirect meanings in electronic communications.

In one example, indirect classifier model service 110 creates and trains each model in generative sequence models 116 by creating an instance of a model in a text classifier and training the model in the text classifier by applying a training set corpus. In one example, a text classifier, such as text classifier 214, text classifier 224, and text classifier 234, represents an instance of a model combined with a scorer, such as scorer 216, scorer 226, and scorer 236, respectively, and trained by a corpus. In one example, each model represents a parametric representation of the patterns inferred from the corpus during a training process. In one example, indirect classifier model service 110 is provided by a service provider that provides a service for use by one or more clients to create and train instances of models in text classifiers as a service provided to the one or more clients.

In one example, indirect classifier model service 110 selects one or more types of model instance to create in a text classifier based on the type of information to be classified. For example, indirect classifier model service 110 selects a type of larger model for generative sequence model B 218 that is effective for training by text classifier 214 for classifying a large volume of examples of words of phrases in baseline corpus 112. In addition, for example, indirect classifier model service 110 selects a type of smaller, parallelized model for generative sequence model X 228 and generative sequence model Y 238, for training by text classifier 224 and text classifier 234, such as a markov model, which can be efficiently parallelized to manage classification of a separate instance of each indirect usage of a word or phrase identified in indirect training corpus 114. According to an advantage of the present invention, by training a separate smaller model, that is easily parallelized, for each instance of a usage of a word or phrase with a potentially indirect meaning, indirect classifier model service 110 is capable of quickly training a large number of models for large volumes of data in indirect training corpus 114 and also quickly trains a large number of models that can be efficiently applied to classify a word or phrase. For example, if indirect training corpus 114 includes a thousand different words or phrases, indirect classifier model service 110 generates a thousand smaller models, each trained to a single word or phrase, which can be efficiently applied in parallel to classify a word or phrase.

For example, indirect classifier model service 110 trains one or more ground truth models, illustrated by generative sequence model B 218, that provide an indicator of whether a word or phrase is likely used based on a common dictionary meaning. In one example, indirect classifier model service 110 trains the one or more ground truth models based on a baseline corpus 112, submitted to a text classifier 214. In one example, baseline corpus 112 includes one or more words and multiple-word phrases, identified as representations of a normal, common dictionary meaning usage of the words and phrases. In one example, indirect classifier model service 110 accesses baseline corpus 112 from one or more sources that are likely to use words and phrases according to the normal, common dictionary meaning or are not likely to use an unusually high level of indirect meanings of words and phrases. For example, baseline corpus 112 includes one or more of a collection of words and phrases from an online dictionary, Wikipedia, business emails, and corporate documents. In one example, baseline corpus 112 includes user-generated data sets, such as a data set compiled by a client monitoring new documents and or scan through old documents in an email or corporate document storage system and mark documents and emails to include in baseline corpus 112. In another example, baseline corpus 112 includes one or more commercially available training sets. In yet another example, baseline corpus 112 includes one or more use-specific automated training sets collected and labeled by an automated training set generation service.

In addition, for example, indirect classifier model service 110 trains a separate indirect meaning model for each indirect instance of usage of a word or phrase, illustrated by generative sequence model X 228 and generative sequence model Y 238. In one example, indirect training corpus 114 includes one or more words and multiple-word phrases, identified as representations of an indirect meaning usage of the words and phrases. In one example, indirect classifier model service 110 accesses indirect training corpus 114 from one or more sources that are more likely to use words and phrases according to an indirect meaning. For example, indirect training corpus 114 includes one or more of a collection of words and phrases from an online dialect dictionary, online slang dictionary, and from communications marked as having an indirect meaning. In one example, indirect training corpus 114 includes user-generated data sets, such as a data set compiled by a client monitoring new communications and or scanning through old documents in an email or corporate document storage system and marking documents and emails to include in indirect training corpus 114. In another example, indirect training corpus 114 includes one or more commercially available training sets collected from services that collect information about words and phrases that are indicated as being used in a manner that has a potentially indirect meaning.

In the example, NLP service 100 deploys the models generated by generative sequence model B 218, generative sequence model X 228, and generative sequence model Y 238 for use in scoring how likely inputs of words and phrases within electronic communications are used with a common meaning or are used with an indirect meaning. While not depicted in the example in FIG. 2, in additional or alternate examples, indirect classifier model service 110 creates and trains large numbers of generative sequence models based on indirect training corpus 114.

Figure 3:
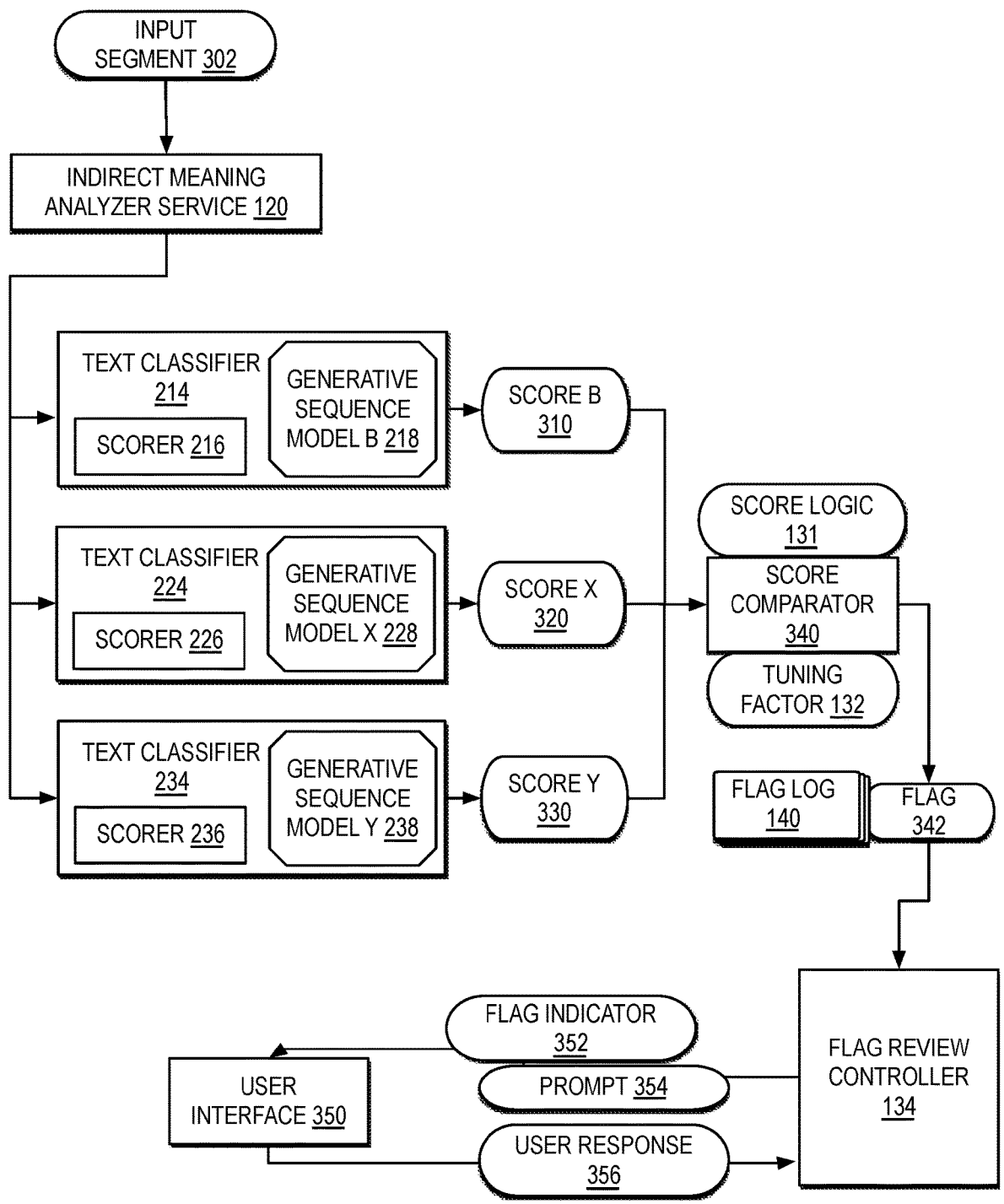
FIG. 3 illustrates a block diagram of one example of an indirect meaning analyzer service for automatically minimizing indirect meanings in electronic communications by identifying and replacing indirect meanings.

FIG. 3 illustrates a block diagram of one example of an indirect meaning analyzer service for automatically minimizing indirect meanings in electronic communications by identifying and replacing indirect meanings.

In one example, NLP service 100 receives an input segment 302. In one example, input segment 302 represents one or more words and phrases. In one example, input segment 302 is extracted from a draft or sent electronic communication of a user and passed through an interface of NLP service 100. In another example, input segment 302 is extracted from electronically stored words or phrases, in a communication, document, or other text source and passed through an interface of NLP service 100.

In the example, indirect meaning analyzer service 120 submits input segment 302 to generative sequence models 116 and obtains a score from each model, in parallel. For example, indirect meaning analyzer service 120 submits input segment 302 to text classifier 214 for scoring by scorer 216 through generative sequence model B 218, to text classifier 224 for scoring by scorer 226 through generative sequence model X 228, and to text classifier 234 for scoring by scorer 236 through generative sequence model Y 238. In the example, text classifier 214 outputs a score B 310 indicating a probability that the meaning of input segment 302 is classified by a normal meaning according to generative sequence model B 218, text classifier 224 outputs a score X 320 indicating a probability that the meaning of input segment 302 is classified by an indirect meaning according to generative sequence model X 228, and text classifier 234 outputs a score Y 330 indicating a probability that the meaning of input segment 302 is classified by an indirect meaning according to generative sequence model Y 238.

In the example, score comparator 340 receives scores from each generative sequence model in parallel and applies score logic 131, with a tuning factor 132, to select one or more flags, such as flag 342. In one example, score logic 131 specifies a comparison of score B 310 summed with tuning factor 132 against score X 320 and score Y 330 and if either score X 320 or score Y 330 are greater than score B 310 summed with tuning factor 320, score comparator 340 specifies flag 342 for input segment 302 for replacement actions based on flag settings 136. In another example, score logic 131 specifies a comparison of score B 310 with score X 320 and score Y 330 and if either score X 320 or score Y 330 are greater than score B 310 without tuning factor 320, score comparator 340 specifies flag 342 for input segment 302 for review to be added to indirect training corpus 114.

In the example, score comparator 340 stores flag 342 in flag log 140. In addition, flag review controller 134 reviews flag 342 and triggers one or more actions based on flag settings 136. In one example, each client subscribing to indirect meaning analyzer service 120 specifies flag settings 136 to trigger actions based on flag 342 specific to each client. In one example, a client subscribing to indirect meaning analyzer service 120 may support application of indirect meaning analyzer service 120 for one or more users through one or more service interfaces.

In one example, flag review controller 134, based on flag settings 136, selects to output a flag indicator 352 to one or more user interfaces, such as user interface 350, and may also include a prompt with the output of the flag, such as prompt 354. In one example, user interface 350 outputs the indicator of what caused input segment 302 to be flagged as directed by flag indicator 352 and outputs a prompt to the user as directed by prompt 354. In one example, a user may respond to prompt 354 through an input to user interface 350, which is returned to flag review controller as user response 356. Based on the input indicated in user response 356, flag review controller 134 determines whether to take additional actions.

In one example, flag settings 136 specifies, in response to flag 342 set because score X 320 or score Y 330 are greater than score B 310 summed with tuning factor 132, sending flag indictor 352 directly to the user interface from which input segment 302 is extracted, such that a user drafting an electronic communication including input segment 302 receives real-time feedback through flag indicator 352 that a proposed use of a word or phrase in input segment 302 has an indirect meaning. In one example, prompt 354 may direct the user to select an alternative word or phrase and may return whether the user selects an alternative word or phrase as user response 356.

In another example, flag settings 136 specifies, in response to flag 342 set because score X 320 or score Y 330 are greater than score B 310 summed with tuning factor 132, sending flag indictor 352 directly to the user interface of an evaluator of electronic communications by the user, such that an evaluator monitoring electronic communications receives real-time indicators through flag indicator 352 that a proposed use of a word or phrase in input segment 302, as drafted or sent by another user, has an indirect meaning. In one example, prompt 354 may direct the evaluator to confirm that the use of the word or phrase in input segment 302 is directed to an indirect meaning or take other action, such as triggering NLP service 100 to evaluate more input segments by the user or increase the frequency of evaluation of input segments. In one example, if an evaluator returns user response 356 indicating that the use of the word or phrase in input segment 302 was not correctly flagged as directed to an indirect meaning, flag review controller 134 updates flag log 140 to indicate that flag 342 is incorrect and evaluates flag log 140 and other factors to determine whether to recommend adjusting tuning factor 132, updating indirect training corpus 114, or taking other actions in response to an incorrect flag. Flag settings 136 may direct flag review controller 134 to automatically perform the recommended action or prompt an evaluator to select whether to trigger the recommended action.

In another example, flag settings 136 specifies, in response to flag 342 set because score X 320 or score Y 330 are greater than score B 310, sending flag indictor 352 directly to the user interface of an evaluator of electronic communications by the user, such that an evaluator monitoring electronic communications receives real-time indicators through flag indicator 352 that a proposed use of a word or phrase in input segment 302, as drafted or sent by another user, potentially has an indirect meaning, and prompt 354 directs the evaluator to indicate whether to update indirect training corpus 114 to reflect that the proposed use of a word or phrase in input segment 302 has an indirect meaning. In one example, if user response 356 indicates the evaluator selects the word or phrase has an indirect meaning, flag review controller 134 updates indirect training corpus 114 with the marking.

Figure 4:
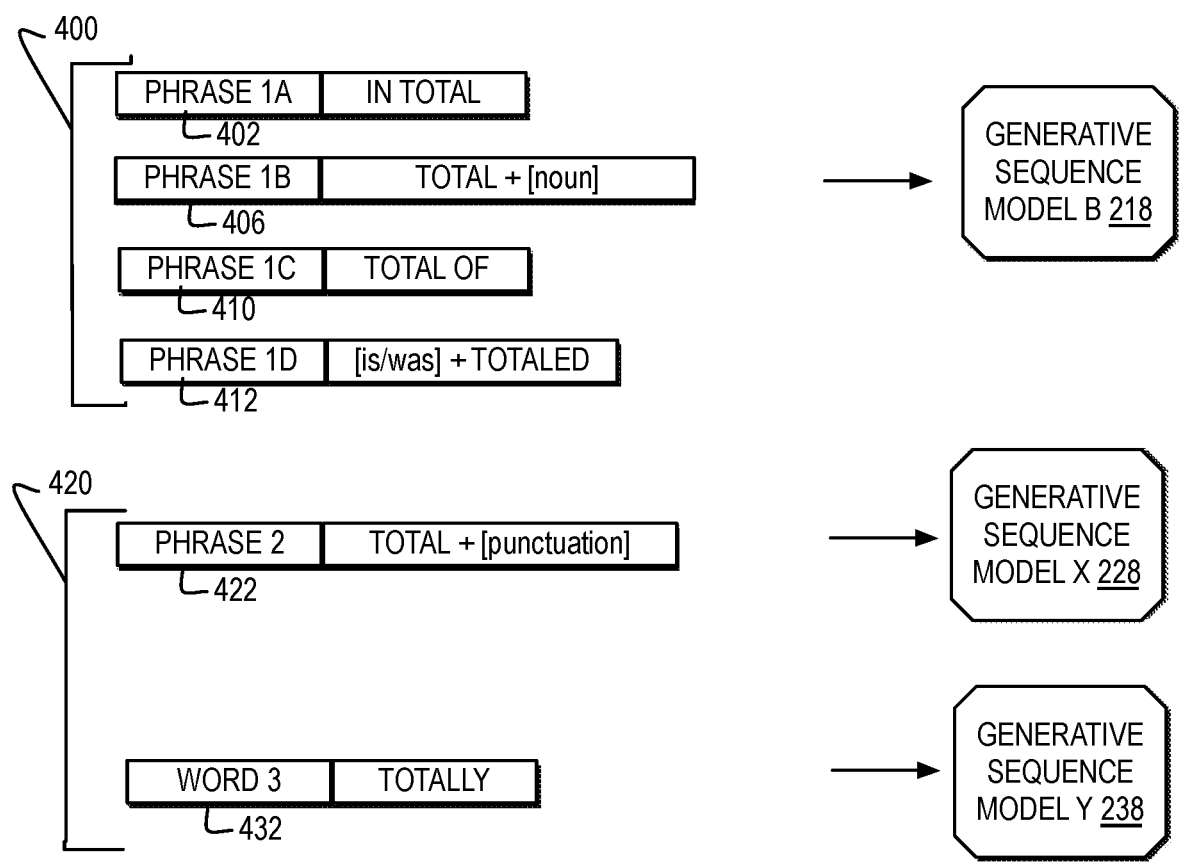
FIG. 4 illustrates a block diagram of a classification model trained from a baseline corpus and multiple classification models trained from an indirect training corpus for managing automatic classification of indirect meanings in electronic communications.

FIG. 4 illustrates a block diagram of one example of a classification model trained from a baseline corpus and multiple classification models trained from an indirect training corpus for managing automatic classification of indirect meanings in electronic communications.

In one example, FIG. 4 includes a first selection of passages 400 from baseline corpus 112, all applied for training generative sequence model B 218 related to common dictionary meanings of words and phrases including "total". In one example, passages 400 includes a phrase 1A 402 of "in total", a phrase 1B 406 of "total+[noun]", a phrase 1C 410 of "total of", and a phrase 1D 412 of "[is/was]+totaled". In the example, each of the phrases are pulled from examples of phrases including "total" based on common dictionary meanings. In the example, the "noun" indicator in phrase 1B 406 indicates any word used in a noun form following "total" and the "is/was" indicator in phrase 1D 412 indicates the use of the word "is" or "was" preceding "totaled".

In the example, FIG. 4 also includes a second selection of passages 420 from indirect training corpus 114, each applied for training a separate generative sequence model related to indirect meanings of words and phrases including "total". In one example, phrase 2 422 of "total+[punctuation]" is applied to train generative sequence model Y 218, where the use of "total," and "total." in communications may have a slang-based indirect meaning if not preceded by "in". In another example, word 3 432 of "totally" is applied to train generative sequence model Y 218, where the use of "totally" in communications may have an indirect meaning that has an unintended, negative impact on a communication.

In one example, if an input segment of "we totally trained 6 models" is applied to generative sequence model B 218, generative sequence model X 228, and generative sequence model Y 238 in parallel, in the example, as to the word "totally", generative sequence model B 218 and generative sequence model X 228 may each output a very low score because the word does not match with any of the trained phrases, but generative sequence model Y 238 is likely to output a score that is higher than the score output by generative sequence model B 218 summed with tuning factor 132. In the example, flag review controller 134 may return flag indicator 352 to a user indicating that the word "totally" should be replaced.

In contrast, in one example, if an input segment of "we trained 6 models in total" is applied to generative sequence model B 218, generative sequence model X 228, and generative sequence model Y 238 in parallel, in the example, as to the phrase "in total", generative sequence model B 218 is likely to output a high score because the phrase matches trained phrase 1A 402 of "in total", but generative sequence model X 228 and generative sequence model Y 238 are likely to each output a very low score because the phrase does not match with either of the phrases applied to train generative sequence model X 228 and generative sequence model Y 238.

In the example in FIG. 4, while the examples of passages 400 and passages 420 illustrate various generic words and phrases including "total", in additional or alternate examples, passages 400 and passages 420 may include more specific words and phrases including "total" and also including other words that may be trained.

Figure 5:
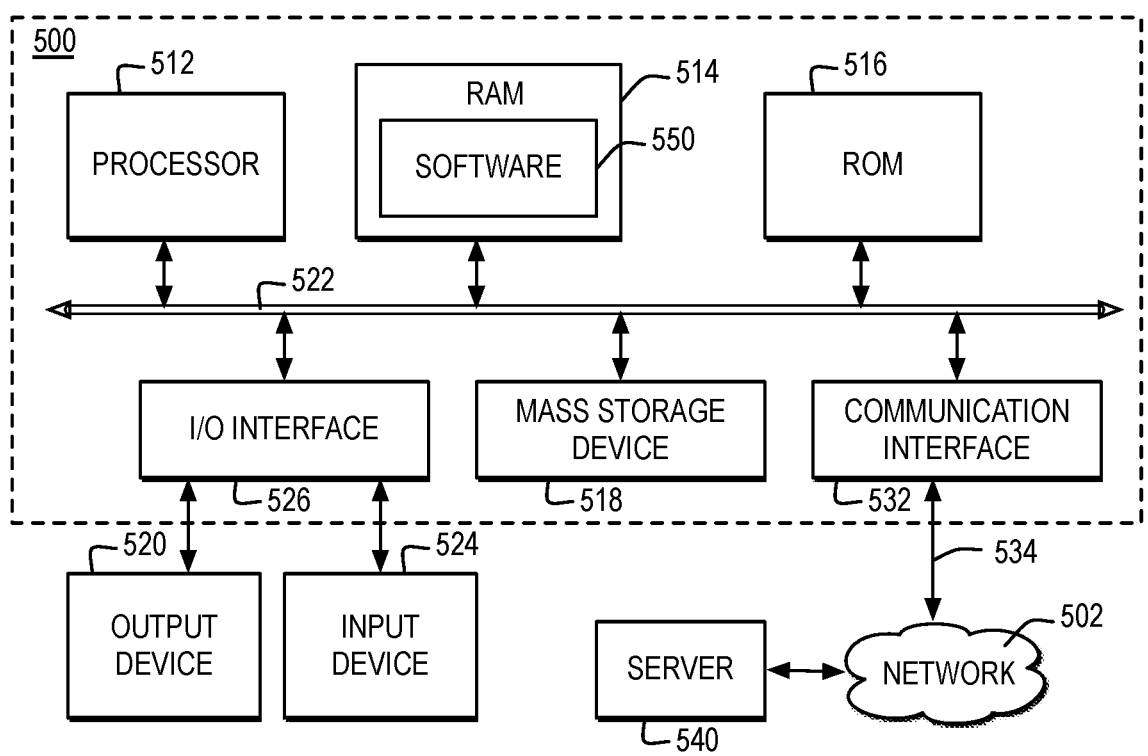
FIG. 5 illustrates a block diagram of one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power.

Processor 512 may be at least one general-purpose processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

Computer system 500 may communicate with a remote computer, such as server 540, or a remote client. In one example, server 540 may be connected to computer system 500 through any type of network, such as network 502, through a communication interface, such as network interface 532, or over a network link that may be connected, for example, to network 502.

In the example, multiple systems within a network environment may be communicatively connected via network 502, which is the medium used to provide communications links between various devices and computer systems communicatively connected. Network 502 may include permanent connections such as wire or fiber optics cables and temporary connections made through telephone connections and wireless transmission connections, for example, and may include routers, switches, gateways and other hardware to enable a communication channel between the systems connected via network 502. Network 502 may represent one or more of packet-switching based networks, telephony-based networks, broadcast television networks, local area and wire area networks, public networks, and restricted networks.

Network 502 and the systems communicatively connected to computer 500 via network 502 may implement one or more layers of one or more types of network protocol stacks which may include one or more of a physical layer, a link layer, a network layer, a transport layer, a presentation layer, and an application layer. For example, network 502 may implement one or more of the Transmission Control Protocol/Internet Protocol (TCP/IP) protocol stack or an Open Systems Interconnection (OSI) protocol stack. In addition, for example, network 502 may represent the worldwide collection of networks and gateways that use the TCP/IP suite of protocols to communicate with one another. Network 502 may implement a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

In one embodiment, the operations performed by processor 512 may control the operations of flowchart of FIGS. 6-9 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts in FIGS. 6-9.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
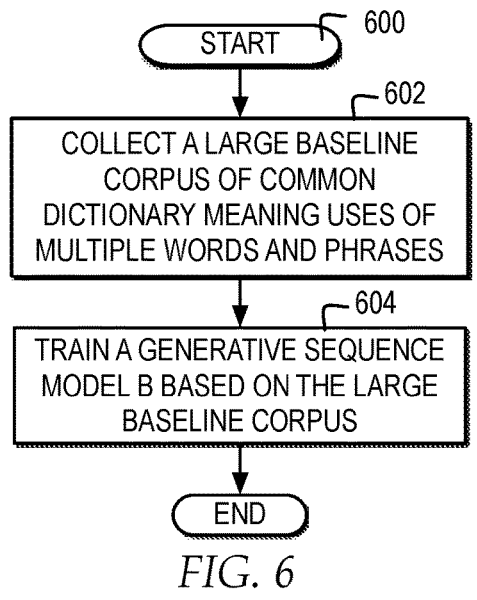
FIG. 6 illustrates a high-level logic flowchart of a process and computer program for creating a model trained on a large baseline corpus of words and phrases indicating a common dictionary meaning.

FIG. 6 illustrates a high-level logic flowchart of a process and computer program for creating a model trained on a large baseline corpus of words and phrases indicating a common dictionary meaning.

In one example, the process and computer program starts at block 600 and thereafter proceeds to block 602. Block 602 illustrates collecting a large baseline corpus of common dictionary meaning uses of multiple words and phrases. Next, block 804 illustrates training a generative sequence model B based on the large baseline corpus, and the process ends.

Figure 7:
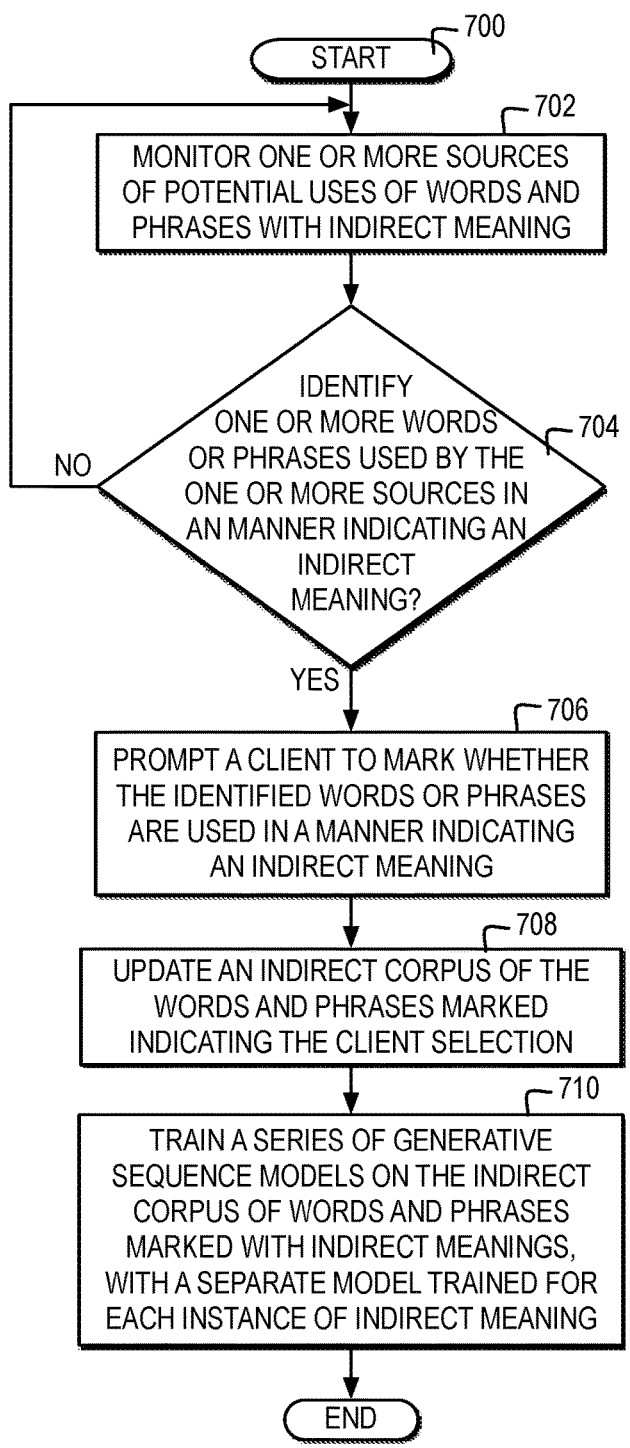
FIG. 7 illustrates a high-level logic flowchart of a process and computer program for creating a separate model for each indirect usage of a word or phrase trained on an indirect corpus of words and phrases.

FIG. 7 illustrates a high-level logic flowchart of a process and computer program for creating a separate model for each indirect usage of a word or phrase trained on an indirect corpus of words and phrases.

In one example, the process and computer program starts at block 700 and thereafter proceeds to block 702. Block 702 illustrates monitoring one or more sources of potential uses and words of phrases with indirect meaning. Next, block 704 illustrates a determination whether one or more words or phrases used by the one or more sources are identified as used in a manner indicating an indirect meaning. At block 704, if one or more words or phrases used by the one or more sources are not identified as used in a manner indicating an indirect meaning, then the process returns to block 702. At block 704, if one or more words or phrases used by the one or more sources are identified as used in a manner indicating an indirect meaning, then the process passes to block 706.

Block 706 illustrates prompting a client to mark whether the identified words or phrases are used in a manner indicating an indirect meaning. Next, block 708 illustrates updating an indirect corpus of the words and phrases with a marking indicating the client selection. Thereafter, block 710 illustrates training a series of generative sequence models on the indirect corpus of words and phrases marked with indirect meanings, with a separate model trained for each instance of indirect meaning, and the process ends.

Figure 8:
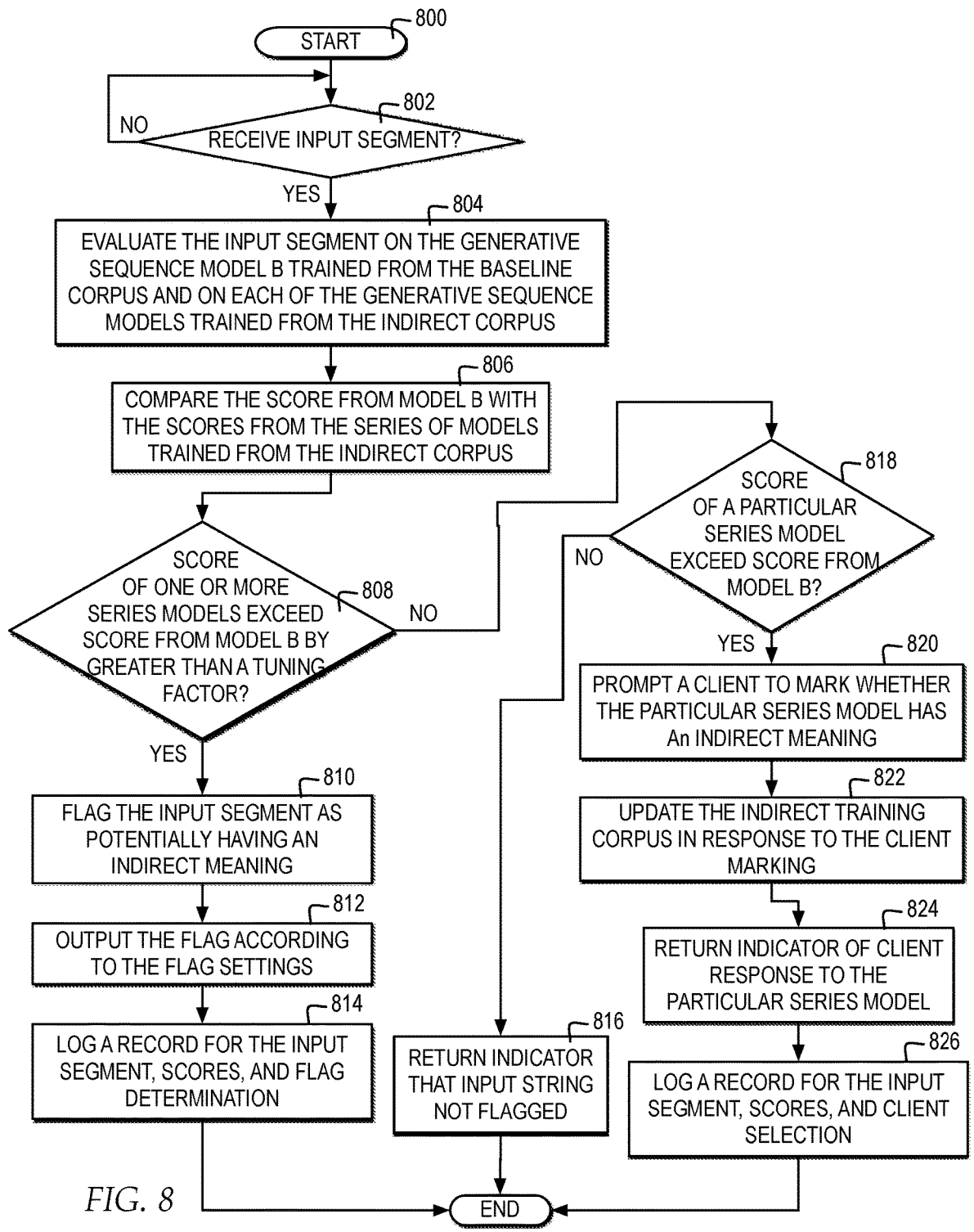
FIG. 8 illustrates a high-level logic flowchart of a process and computer program for identifying and replacing words and phrases with indirect meanings in an input segment.

FIG. 8 illustrates a high-level logic flowchart of a process and computer program for identifying and replacing words and phrases with indirect meanings in an input segment.

In one example, the process and computer program starts at block 800 and thereafter proceeds to block 802. Block 802 illustrates a determination whether an input segment is received. At block 802, if an input segment is received, then the process passes to block 804. Block 804 illustrates evaluating the input segment on the generative sequent model B trained from the baseline corpus and on each of the generative sequence models trained from the indirect corpus. Next, block 806 illustrates comparing the score from model B with the scores from the series of models trained from the indirect corpus. Thereafter, block 808 illustrates a determination whether a score of one or more of the series models exceeds the score from the model B by greater than a tuning factor.

At block 808, if the score of one or more of the series models exceeds the score from the model B by greater than a tuning factor, then the process passes to block 810. Block 810 illustrates flagging the input segment as potentially having an indirect meaning. Next, block 812 illustrates outputting the flag according to the flag settings. Thereafter, block 814 illustrates logging a record for the input segment, scores, and flag determination, and the process ends.

Returning to block 808, if the score of one or more of the series models does not exceed the score from the model B by greater than a tuning factor, then the process passes to block 818. Block 818 illustrates a determination whether a score of a particular series model exceeds the score from the model B. At block 818, if the score of a particular series model does not exceed the score from the model B, then the process passes to block 816. Block 816 illustrates returning an indicator that the input string is not flagged, and the process ends.

Returning to block 818, at block 818, if the score of a particular series model does exceed the score from the model B, then the process passes to block 820. Block 820 illustrates prompting a client to mark whether the particular series model has an indirect meaning. Next, block 822 illustrates updating the indirect training corpus in response to the client marking. Thereafter, block 824 illustrates returning an indicator of the client response to the particular series model. Next, block 826 illustrates logging a record for the input segment, scores, and client selection, and the process ends.

Figure 9:
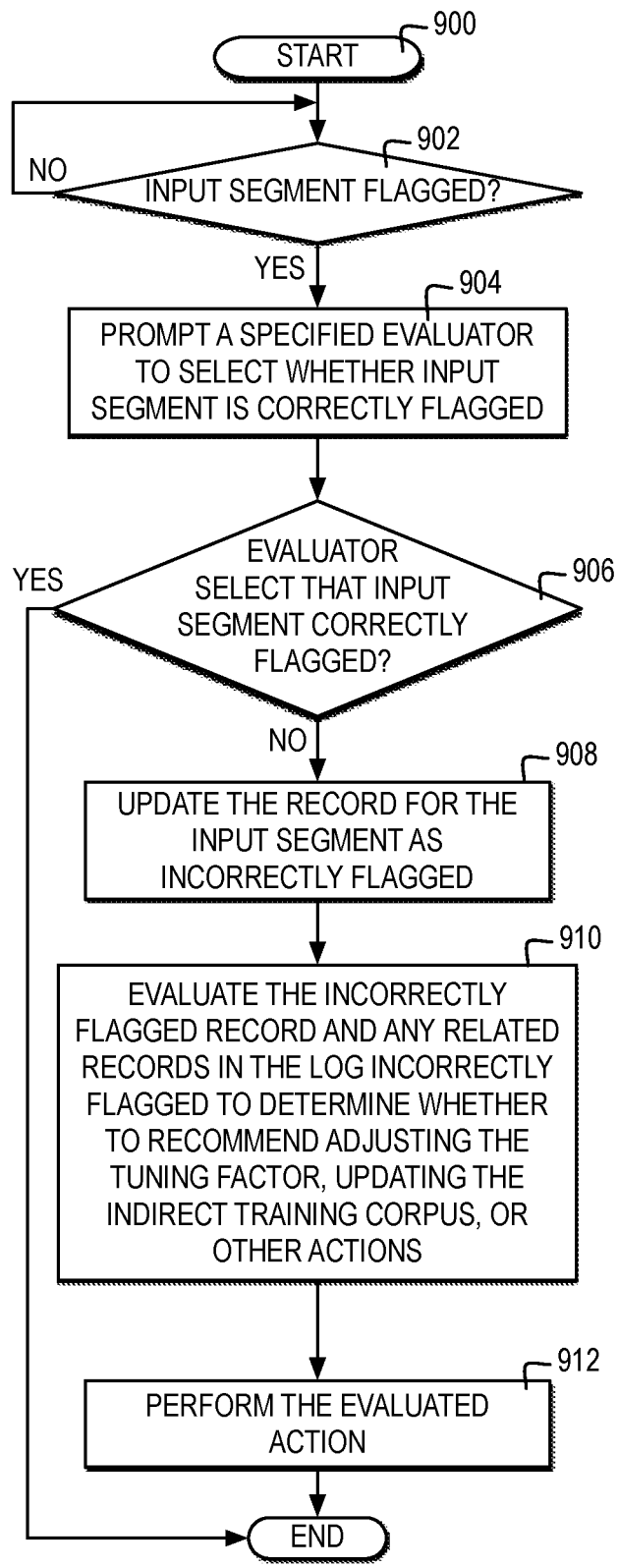
FIG. 9 illustrates a high-level logic flowchart of a process and computer program for evaluating incorrectly flagged input segments.

FIG. 9 illustrates a high-level logic flowchart of a process and computer program for evaluating incorrectly flagged input segments.

In one example, the process and computer program starts at block 900 and thereafter proceeds to block 902. Block 902 illustrates a determination whether an input segment is flagged. At block 902, if an input segment is flagged, then the process passes to block 904. Block 904 illustrates prompting a specified evaluator to select whether the input segment is correctly flagged. Next, block 906 illustrates a determination whether the evaluator selects that the input segment is correctly flagged. At block 906, if the evaluator selects that the input segment is correctly flagged, then the process ends. At block 906, if the evaluator selects that the input segment is not correctly flagged, then the process passes to block 908.

Block 908 illustrates updating the record for the input segment as incorrectly flagged. Next, block 910 illustrates evaluating the incorrectly flagged record and any related records in the log incorrectly flagged to determine whether to recommend adjusting the tuning factor, updating the indirect training corpus, or other actions. Thereafter, block 912 illustrates performing the evaluated action, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:

evaluating, by a computing device, an input segment of a communication, in parallel, by a baseline classification model trained with a plurality of baseline passages indicating dictionary meaning and a plurality of generative sequence models each trained to classify a particular passage from among a plurality of indirect passages indicating usage with an indirect meaning, to receive a separate score from the baseline classification model and each of the plurality of generative sequence models, each separate score indicating a classification probability for the input segment; and responsive to one or more particular scores generated by one or more of the plurality of generative sequence models exceeding a baseline score generated by the baseline classification model summed with a tuning factor, flagging, by the computing device, the input segment as having a potentially indirect meaning.

2. The method according to claim 1, further comprising:

training, by the computing device, the baseline classification model based on the plurality of baseline passages in a baseline corpus, the baseline corpus corresponding to uses identified as dictionary meanings; and training, by the computing device, the plurality of generative sequence models each by a respective passage from among the plurality of indirect passages in an indirect training corpus, the indirect training corpus corresponding to uses identified as indirect meanings not identified in the dictionary meanings.

3. The method according to claim 2, further comprising:
training, by the computing device, the plurality of generative sequence models each to the respective passage from among the plurality of indirect meaning passages in the indirect training corpus, each respective passage comprising at least one similar word in combination with one or more different words.

4. The method according to claim 2, further comprising:
monitoring, by the computing device, one or more website sources for addition of one or more additional passages indicating usage with the indirect meaning;
responsive to detecting addition of one or more additional passages indicating usage with the indirect meaning, prompting, by the computing device, a client to mark whether the one or more additional passages are used with the indirect meaning;
responsive to the client marking the one or more additional passages used with the indirect meaning, updating, by the computing device, the indirect training corpus with the one or more additional passages; and
training, by the computing device, a plurality of additional generative sequence models each by an additional respective passage from among the one or more additional passages in the indirect training corpus.

5. The method according to claim 1, further comprising:
responsive to one or more particular scores generated by one or more of the plurality of generative sequence models exceeding a baseline score generated by the baseline classification model, flagging, by the computing device, the input segment as requiring evaluation by a client; and
responsive to the input segment flagged as requiring evaluation by the client, prompting, by the computing device, the client to mark whether the input segment is used with the indirect meaning;
responsive to the client marking the input segment used with the indirect meaning, updating, by the computing device, the indirect training corpus with the input segment; and
training, by the computing device, a plurality of additional generative sequence models each by an additional respective passage from the input segment added to the indirect training corpus.

6. The method according to claim 1, further comprising:
responsive to the input segment flagged as having a potentially indirect meaning, prompting, by the computing device, a client to mark whether the input segment is correctly flagged as being used with the indirect meaning; and
responsive to the client marking the input segment as incorrectly flagged as being used with the indirect meaning, evaluating, by the computing device, whether to adjust the tuning factor to reduce the probability of a subsequent incorrect flagging.

7. The method according to claim 1, further comprising:
creating, by the computing device, the baseline classification model and the plurality of generative sequence models each for training by a separate text classifier of a natural language processing system.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to evaluate an input segment of a communication, in parallel, by a baseline classification model trained with a plurality of baseline passages indicating dictionary meaning and a plurality of generative sequence models each trained to classify a particular passage from among a plurality of indirect passages indicating usage with an indirect meaning, to receive a separate score from the baseline classification model and each of the plurality of generative sequence models, each separate score indicating a classification probability for the input segment; and
program instructions to, responsive to one or more particular scores generated by one or more of the plurality of generative sequence models exceeding a baseline score generated by the baseline classification model summed with a tuning factor, flag the input segment as having a potentially indirect meaning.

9. The computer system according to claim 8, the program instructions further comprising:
program instructions to train the baseline classification model based on the plurality of baseline passages in a baseline corpus, the baseline corpus corresponding to uses identified as dictionary meanings; and
program instructions to train the plurality of generative sequence models each by a respective passage from among the plurality of indirect passages in an indirect training corpus, the indirect training corpus corresponding to uses identified as indirect meanings not identified in the dictionary meanings.

10. The computer system according to claim 9, the program instructions further comprising:
program instructions to train the plurality of generative sequence models each to the respective passage from among the plurality of indirect meaning passages in the indirect training corpus, each respective passage comprising at least one similar word in combination with one or more different words.

11. The computer system according to claim 9, the program instructions further comprising:
program instructions to monitor one or more web site sources for addition of one or more additional passages indicating usage with the indirect meaning;
program instructions to, responsive to detecting addition of one or more additional passages indicating usage with the indirect meaning, prompt a client to mark whether the one or more additional passages are used with the indirect meaning;
program instructions to, responsive to the client marking the one or more additional passages used with the indirect meaning, update the indirect training corpus with the one or more additional passages; and
program instructions to train a plurality of additional generative sequence models each by an additional respective passage from among the one or more additional passages in the indirect training corpus.

12. The computer system according to claim 8, the program instructions further comprising:
program instructions to, responsive to one or more particular scores generated by one or more of the plurality of generative sequence models exceeding a baseline score generated by the baseline classification model, flag the input segment as requiring evaluation by a client; and program instructions to, responsive to the input segment flagged as requiring evaluation by the client, prompt the client to mark whether the input segment is used with the indirect meaning;

program instructions to, responsive to the client marking the input segment used with the indirect meaning, update the indirect training corpus with the input segment; and program instructions to train a plurality of additional generative sequence models each by an additional respective passage from the input segment added to the indirect training corpus.

13. The computer system according to claim 8, the program instructions further comprising:

program instructions to, responsive to the input segment flagged as having a potentially indirect meaning, prompt a client to mark whether the input segment is correctly flagged as being used with the indirect meaning; and program instructions to, responsive to the client marking the input segment as incorrectly flagged as being used with the indirect meaning, evaluate whether to adjust the tuning factor to reduce the probability of a subsequent incorrect flagging.

14. The computer system according to claim 8, the program instructions further comprising:

program instructions to create the baseline classification model and the plurality of generative sequence models each for training by a separate text classifier of a natural language processing system.

15. A computer program product comprises a computer readable storage medium having program instructions embodied therewith, wherein the computer readable storage medium is not a transitory signal per se, the program instructions executable by a computer to cause the computer to:

evaluate, by a computer, an input segment of a communication, in parallel, by a baseline classification model trained with a plurality of baseline passages indicating dictionary meaning and a plurality of generative sequence models each trained to classify a particular passage from among a plurality of indirect passages indicating usage with an indirect meaning, to receive a separate score from the baseline classification model and each of the plurality of generative sequence models, each separate score indicating a classification probability for the input segment; and responsive to one or more particular scores generated by one or more of the plurality of generative sequence models exceeding a baseline score generated by the baseline classification model summed with a tuning factor, flag, by the computer, the input segment as having a potentially indirect meaning.

16. The computer program product according to claim 15, further comprising the program instructions executable by a computer to cause the computer to:

train, by the computer, the baseline classification model based on the plurality of baseline passages in a baseline corpus, the baseline corpus corresponding to uses identified as dictionary meanings; and train, by the computer, the plurality of generative sequence models each by a respective passage from among the plurality of indirect passages in an indirect training corpus, the indirect training corpus corresponding to uses identified as indirect meanings not identified in the dictionary meanings.

17. The computer program product according to claim 16, further comprising the program instructions executable by a computer to cause the computer to:

train, by the computer, the plurality of generative sequence models each to the respective passage from among the plurality of indirect meaning passages in the indirect training corpus, each respective passage comprising at least one similar word in combination with one or more different words.

18. The computer program product according to claim 16, further comprising the program instructions executable by a computer to cause the computer to:

monitor, by the computer, one or more website sources for addition of one or more additional passages indicating usage with the indirect meaning;

responsive to detecting addition of one or more additional passages indicating usage with the indirect meaning, prompt, by the computer, a client to mark whether the one or more additional passages are used with the indirect meaning;

responsive to the client marking the one or more additional passages used with the indirect meaning, update, by the computer, the indirect training corpus with the one or more additional passages; and train, by the computer, a plurality of additional generative sequence models each by an additional respective passage from among the one or more additional passages in the indirect training corpus.

19. The computer program product according to claim 15, further comprising the program instructions executable by a computer to cause the computer to:

responsive to one or more particular scores generated by one or more of the plurality of generative sequence models exceeding a baseline score generated by the baseline classification model, flag, by the computer, the input segment as requiring evaluation by a client; and responsive to the input segment flagged as requiring evaluation by the client, prompt, by the computer, the client to mark whether the input segment is used with the indirect meaning;

responsive to the client marking the input segment used with the indirect meaning, update, by the computer, the indirect training corpus with the input segment; and train, by the computer, a plurality of additional generative sequence models each by an additional respective passage from the input segment added to the indirect training corpus.

20. The computer program product according to claim 15, further comprising the program instructions executable by a computer to cause the computer to:

responsive to the input segment flagged as having a potentially indirect meaning, prompt, by the computer, a client to mark whether the input segment is correctly flagged as being used with the indirect meaning; and responsive to the client marking the input segment as incorrectly flagged as being used with the indirect meaning, evaluate, by the computer, whether to adjust the tuning factor to reduce the probability of a subsequent incorrect flagging.

* * * * *